United States Patent Office 2,776,277
Patented Jan. 1, 1957

2,776,277

DIELS-ALDER REACTION

Gerald I. Keim, Oxford, Pa., assignor to Hercules Powder Company, Wilmington, Del., a corporation of Delaware No Drawing. Application June 29, 1953, Serial No. 364,911

5 Claims. (Cl. 260—101)

This invention relates to an improved process for reacting maleic anhydride with rosin. Adducts of maleic anhydride and rosin are widely used. Thus, such adducts are useful as intermediates in the preparation of resinous esters for the paint industry. More recently, rosin-maleic anhydride adducts which have been at least partially neutralized with an alkali such as sodium hydroxide have been found useful as adjuncts for use with rosin size in the sizing of paper. In this case, the addition of a small proportion of the at least partially neutralized rosin-maleic anhydride adduct has been found to greatly increase the efficiency of the rosin size.

Naturally occurring rosins contain a mixture of isomeric resin acids. Three of these resin acids which have the same isomeric structure are termed "abietic-type resin acids" and comprise the bulk of commercial rosins. These are neoabietic acid, abietic acid and levopimaric acid. Maleic anhydride adds to rosin by 1:4 addition to give a Diels-Alder reaction product. Of the above-named rosin acids only levopimaric forms a Diels-Alder adduct. These resin acids, however, are apparently in equilibrium so that the addition of maleic anhydride to rosin may proceed to completion, reacting all of the abietic-type resin acids.

It has been found that if a strong acid is added along with the maleic anhydride the reaction proceeds more quickly. However, whether the maleic anhydride is reacted directly with the rosin without a catalyst or whether the reaction is catalyzed by the use of a strong acid, large amounts of maleic anhydride are lost through side reactions. The amount lost may vary anywhere from 20% to over 50% of the maleic anhydride added. This represents a very substantial loss in any commercial process.

I have now discovered a process whereby loss of maleic anhydride in side reactions is greatly reduced with resulting economies in the consumption of maleic anhydride. It is known that if rosin is heated in the presence of a strong acid the rosin is isomerized, i. e., both the neoabietic acid and the levopimaric acid are converted in large amount to abietic acid. I have now found that if rosin is acid isomerized to the point that it has a specific rotation $[\alpha]_D^{24°}$ of at least $-15°$, and preferably to the point that it has a specific rotation $[\alpha]_D^{24°}$ of from $-18°$ to $-25°$, before reaction with maleic anhydride, on reacting such an isomerized rosin with maleic anhydride, loss of maleic anhydride through side reactions is considerably reduced. Why this should be so, since prior acid isomerization increases the content of abietic acid which cannot react with maleic anhydride, I do not know. However, by the use of this process, from 80% to 90% of the maleic anhydride is reacted with the rosin.

Furthermore, the product of this process is characterized by the unusual property of producing substantially less foam than an adduct prepared from unisomerized rosin when used in the paper-making process either as a size or as a size aid.

The acid isomerization of rosin is well known in the prior art and any such process known to the art which will isomerize rosin so as to give a degree of specific rotation $[\alpha]_D^{24°}$ of at least $-15°$ is operable in the instant process. In general, any strong acid may be used. As used in the art, a strong acid is any acid which has an ionization constant greater than about $10^{-3}$. Thus, any sulfonic acid, such as p-toluenesulfonic acid, naphthalenesulfonic acid, benzenesulfonic acid, etc.; any hydrohalogen acid, such as hydrochloric acid, etc., phosphoric acid, sulfuric acid and others may be used. For reasons of economy and commerical convenience it is preferred to use sulfuric acid.

The time required for isomerization will vary from a few minutes to a few hours and the temperature may vary from the melting point of the rosin to the temperature at which substantial decorboxylation occurs, generally above about 200° C. Similarly, the concentration of acid may vary from 0.01% to about 0.4%, based on the rosin. As is evident the particular combination of conditions required to give the necessary degree of isomerization may vary widely. The process of acid isomerization, however, is well known to those skilled in the art and the variation of conditions necessary to obtain the desired degree of isomerization will be readily apparent to those skilled in the art. Any process of acid isomerization which will give the required degree of isomerization is useful in the process of the instant invention.

The acid isomerized rosin is differentiated from the heat-isomerized rosin known in the art as the latter has a low negative specific rotation. Moreover, attempts to obtain a more highly negative specific rotation than is customary from heat isomerization results in decarboxylation with the consequent formation of rosin oils.

The following examples are set forth in illustration but not in limitation of the invention. All parts and percentages are by weight unless otherwise specified.

Example 1

Gum rosin having a specific rotation $[\alpha]_D^{24°}$ of $+32°$ was heated with agitation to 160° C. 0.1% of 95% concentrated sulfuric acid was added to the rosin while temperature and agitation were maintained for 45 minutes. The specific rotation $[\alpha]_D^{24°}$ of the resulting isomerized rosin was $-22°$. 5.4 parts of maleic anhydride were added to 94.6 parts of the isomerized rosin and the temperature and agitation maintained until the maleic anhydride was exhausted which took about 30 minutes. The product so obtained contained 21.2% levopimaric acid-maleic anhydride adduct.

Example 2

Gum rosin having a specific rotation $[\alpha]_D^{24°}$ of $+32°$ was heated to 160° C. with agitation. To 93.5 parts of the rosin were then added 6.5 parts of maleic anhydride and the reaction continued until the maleic anhydride was exhausted which took about 30 minutes. Although a substantially larger quantity of maleic anhydride was used, this product also contained 21.2% levopimaric acid-maleic anhydride adduct. Thus, as may be seen from Examples 1 and 2, 20% more maleic anhydride was required to prepare an adduct containing approximately 20% levopimaric acid-maleic anhydride adduct from unisomerized gum rosin than was required when isomerized gum rosin was used. Furthermore, when the product prepared in Example 1 from isomerized gum rosin was used as a paper size, only half as much foam was observed as when a size prepared from the unisomerized gum rosin in Example 2 was used.

Example 3

One hundred parts of gum rosin having a specific rotation $[\alpha]_D^{24°}$ of $+32°$ were heated to 160° C. with agitation. 0.1% of 95% concentrated sulfuric acid was added and the rosin held at 150°–175° C. for 30 minutes. The product had a specific rotation $[\alpha]_D^{24°}$ of $-24°$. Then 3.25% maleic anhydride was added and the temperature maintained at 160° C. until the maleic anhydride had reacted, which took about 30 minutes. The product so prepared contained 11.2% levopimaric acid-maleic anhydride adduct.

*Example 4*

One hundred parts gum rosin having a specific rotation $[\alpha]_D^{24°}$ of $+32°$ were heated to 160° C. with agitation and 3.25% maleic anhydride added. The temperature and agitation were maintained until the maleic anhydride had reacted, which took about 30 minutes. The product so obtained contained only 6.5% levopimaric acid-maleic anhydride adduct, only half the amount when the gum rosin had been isomerized as set forth in Example 3.

*Example 5*

One hundred parts of wood rosin having a specific rotation $[\alpha]_D^{24°}$ of $+13°$ were heated to 160° C. with agitation. 0.1% of 95% concentrated sulfuric acid was then added and agitation maintained for about 30 minutes to effect isomerization of the rosin. The product had a specific rotation $[\alpha]_D^{24°}$ of $-16.5°$. Then 3.25% maleic anhydride was added and reaction continued until the maleic anhydride had all reacted, which took about 30 minutes. The product so obtained was analyzed and it was found that only 12.3% of the original maleic anhydride had been lost to side reactions.

*Example 6*

One hundred parts wood rosin having a specific rotation $[\alpha]_D^{24°}$ of $+13°$ were heated to 160° C. with agitation. To the rosin was then added 3.25% maleic anhydride, and the heat and agitation maintained until the reaction was complete, which took about 30 minutes. The product so obtained was analyzed and it was found that 33.2% of the original maleic anhydride, more than twice the amount in Example 5, had been lost through side reactions.

*Example 7*

One hundred parts of gum rosin having a specific rotation $[\alpha]_D^{24°}$ of $+32°$ were heated to 145° C. with agitation. To the rosin was then added 0.1% of 95% concentrated sulfuric acid, and heat and agitation continued for 45 minutes. The product had a specific rotation $[\alpha]_D^{24°}$ of $-18°$. Then 3.25% maleic anhydride was added, and the heat and agitation continued until the reaction was completed, which took about 30 minutes. The product so obtained was analyzed, and it was found that only 15.5% of the original maleic anhydride had been lost through side reactions.

*Example 8*

One hundred parts of gum rosin having a specific rotation $[\alpha]_D^{24°}$ of $+32°$ were heated to 145° C. with agitation. There was then added 0.1% of 95% concentrated sulfuric acid immediately followed by 3.25% of maleic anhydride. Heat and agitation were maintained until the reaction was completed, which took about 30 minutes. The product so obtained contained only 58.8% of the original maleic anhydride, 41.2% of the anhydride having been lost through side reactions. Thus, it is evident from Examples 7 and 8 that adding the acid concurrently with the maleic anhydride does not reduce side reactions of the maleic anhydride and the rosin.

Once the rosin has been acid isomerized to the required extent the following reaction with maleic anhydride may be carried out so as to give a product having a minor portion of adduct or the rosin may be reacted completely with maleic anhydride. The ratio of maleic anhydride to rosin will vary greatly, depending on the end use of the adduct. Thus, from one-twentieth to one mole of maleic anhydride per mole of rosin may be used when the adduct is used either as a size or as a size aid. Representative sizing compositions containing these adducts are described, for example, in U. S. 2,081,889 to Borglin and U. S. 2,628,918 to Wilson and Bump. For other uses, different ratios of maleic anhydride to rosin may be useful. In any case, the ratio of reactants is not critical for the process of the instant invention. In any case, the loss of maleic anhydride through side reactions will be greatly minimized when the rosin is first isomerized to a specific rotation $[\alpha]_D^{24°}$ of at least $-15°$. While the invention has been discussed in terms of maleic anhydride, it is understood that maleic acid is equivalent to maleic anhydride in the process of the instant invention and is fully interchangeable therewith.

As shown in the examples, either gum or wood rosin may be used. Once the rosin has been isomerized to the required degree, the reaction of maleic anhydride may be carried out in bulk in the molten rosin or with the rosin dissolved in an inert solvent in accordance with any of the procedures known to the art.

What I claim and desire to protect by Letters Patent is:

1. In the process of forming a Diels-Alder reaction product of a rosin and a compound selected from the group consisting of maleic acid and maleic anhydride, the improvement which comprises acid isomerizing the rosin to a negative specific rotation $[\alpha]_D^{24°}$ of at least $-15°$ before formation of the Diels-Alder product.

2. A process according to claim 1 wherein the rosin is gum rosin.

3. A process according to claim 1 wherein the rosin is wood rosin.

4. A process according to claim 1 wherein the acid isomerization catalyst is sulfuric acid.

5. A process according to claim 1 wherein the specific rotation $[\alpha]_D^{24°}$ of the rosin is from $-18°$ to $-25°$.

References Cited in the file of this patent

UNITED STATES PATENTS

| | | |
|---|---|---|
| 2,367,380 | Spiller | Jan. 16, 1945 |
| 2,465,888 | Lawerence | Mar. 29, 1949 |
| 2,476,450 | Morris | July 19, 1949 |

OTHER REFERENCES

Palkin: Jr. Chem. Education (January 1935), pp. 35–40, 260–101.

Hovey et al.: Ind. and Eng. Chem., vol. 32, pp. 272–278, 260–101.